United States Patent [19]
Jaulain et al.

[11] Patent Number: 6,002,535
[45] Date of Patent: Dec. 14, 1999

[54] DEVICE TO FASTEN A LASER GYROMETER OPTICAL UNIT TO AN ACTUATING MECHANISM

[75] Inventors: Yves Jaulain, Scorbe Clairvaux; Eric Loil, Chatellerault; Jacques Cordonnier, Colombiers; Etienne Bonnaudet, Haut Fontaine St George les Baillargeaux, all of France

[73] Assignee: Sextant Avionique, Velizy Villacoublay, France

[21] Appl. No.: 09/013,070

[22] Filed: Jan. 26, 1998

[30] Foreign Application Priority Data

Feb. 5, 1997 [FR] France .................................. 97 01269

[51] Int. Cl.$^6$ ........................................................ G02B 7/02
[52] U.S. Cl. ........................... 359/830; 359/819; 359/822
[58] Field of Search .................................... 359/819, 822, 359/830

[56] References Cited

U.S. PATENT DOCUMENTS

| | | | |
|---|---|---|---|
| 3,503,688 | 3/1970 | Lechevalier | 356/350 |
| 5,249,082 | 9/1993 | Newman | 359/813 |
| 5,457,641 | 10/1995 | Zimmer et al. | 702/153 |

FOREIGN PATENT DOCUMENTS 2 137 013  9/1984  United Kingdom.

*Primary Examiner*—Georgia Epps
*Assistant Examiner*—Suzanne Letendre
*Attorney, Agent, or Firm*—Oblon, Spivak, McClelland, Maier & Neustadt, P.C.

[57] ABSTRACT

A device for fastening an optical unit to an actuating ring of an actuating device including a fastening ring joined to the actuating ring and having a plurality of securing shims bonded to the optical unit and connected to the fastening ring by flexible axial tongues. The device can be applied to a triaxial laser gyrometer.

22 Claims, 3 Drawing Sheets

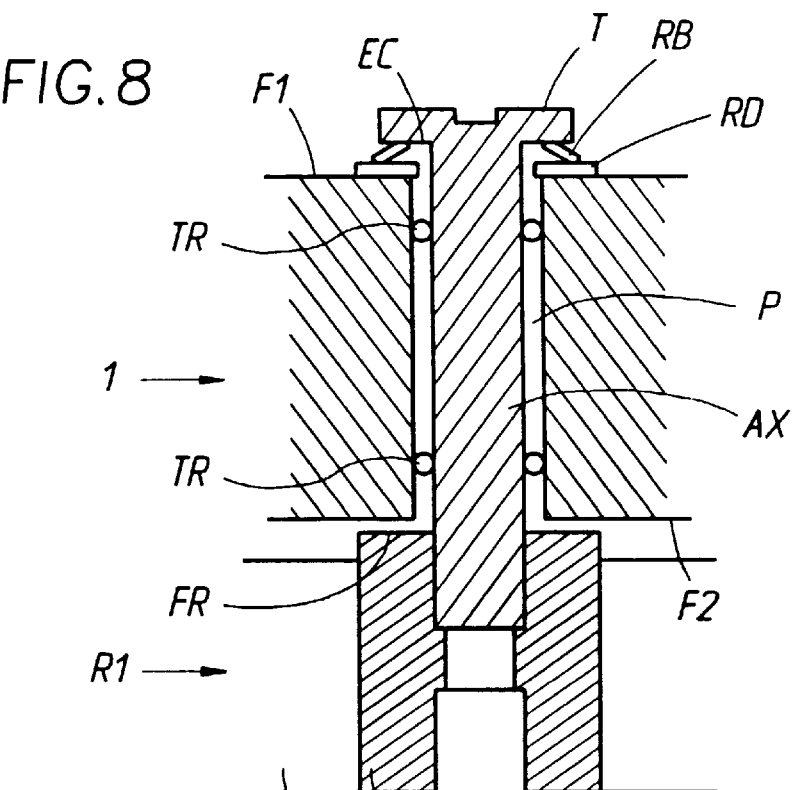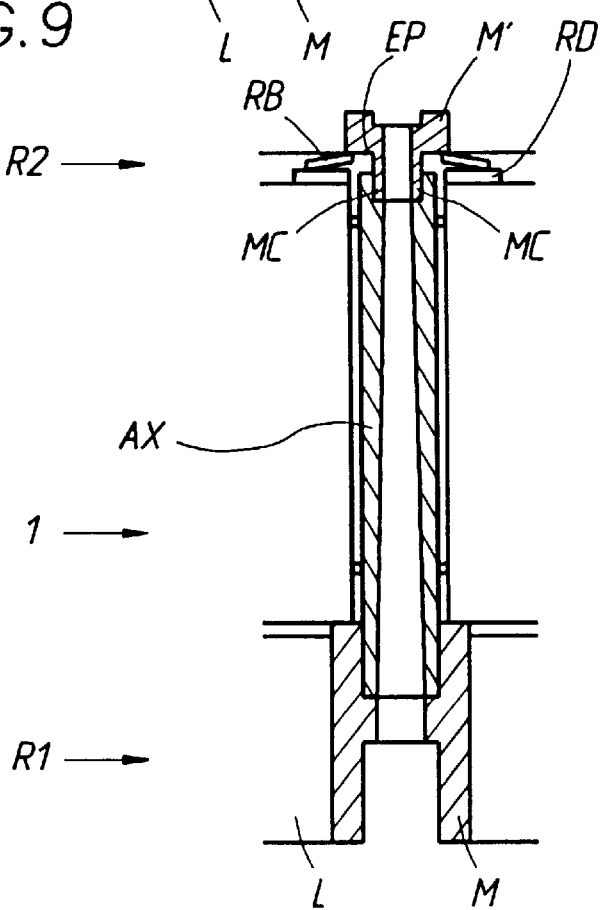

DEVICE TO FASTEN A LASER GYROMETER OPTICAL UNIT TO AN ACTUATING MECHANISM

BACKGROUND OF THE INVENTION

1. Field of the Invention

The present invention relates to a device for fixing or fastening an optical unit of a laser gyrometer to an actuating mechanism.

The present invention can be applied both to single-axis gyrometers in which the optical cavities extend in one and the same plane as well as to triaxial gyrometers in which the optical cavities extend in three dimensions.

2. Dicussion of the Background

In general, it is known that the optical units used in laser gyrometers are made out of materials having very low coefficients of expansion such as quartz or Zerodur. Indeed, these optical units comprise resonant optical cavities made by very high-precision machining. The dimensions of these cavities must remain constant whatever the environment in which they are placed (especially in a very wide range of temperature).

Furthermore, to avoid disturbances through flows within the cavities, the optical unit must have high thermal homogeneity so as to prevent the presence of high thermal gradients as far as possible.

The actuating mechanism used to drive the unit in an alternating rotational motion is usually made of a metal with high properties of elasticity but with a coefficient of expansion that is not negligible.

Given the nature and the properties of the materials used, the fastening of the optical unit to its actuating mechanism raises many problems.

First of all, the hardness of the unit, its fragility (frangibility) and the fact that it is poorly machinable rule out most standard fastening means, given that these means generally induce defects of mechanical and thermal homogeneity in the unit. These defects run counter to the goals in view.

Nor is the bonding of the unit directly to an actuating ring a satisfactory solution, given the phenomena of differential expansion between the ring and the unit: This differential expansion creates shear strains at the bonding zone prompting the breakage of the link between the unit and the activating ring.

Furthermore, the relatively large surface area of contact between these two parts, which is necessary for efficient fastening, induces thermal heterogeneity within the unit.

SUMMARY OF THE INVENTION

The invention is therefore more particularly aimed at a mode of fastening that resolves all the problems referred to here above.

To this end, it therefore proposes a fastening device that makes use of a fastening element comprising means to transmit the rotational torque generated by the actuating mechanism as well as means to compensate for the differences in dimensions that arise between the unit and the actuating ring of the actuating mechanism.

According to a first mode of execution of the invention, the fastening device could bring into action a fastening ring bearing a plurality of securing shims uniformly distributed around said ring and connected to this ring by a flexible axial tongue in the shape of a cylindrical sector, said securing shims being designed to get fastened by bonding to at least one face of the optical unit.

By this arrangement, the torque is transmitted efficiently through the tangential stiffness of the axial tongues while the problems resulting from the differential expansion are resolved through the flexibility of the tongues and through the fact that the surface area of contact between the shims and the unit is limited and that, consequently, the dimensional variations of the shims remain within the limits of tolerance of the bonding.

This approach is particularly well suited to the fastening of a triaxial gyrometer whose optical unit has a octahedral shape and is activated along the axis passing through the center of two parallel and opposite triangular faces of the unit, these faces being bordered by chamfered ridges.

In this case, the fastening ring could include three pairs of beveled shims located at 120° with respect to one another, designed to be bonded to the central regions of the chamfered ridges surrounding one of said triangular faces.

This mode of fastening has the advantage of reducing the shearing strains of the bonding zones to the minimum.

These bonding zones are thereafter subjected to practically nothing other than compressive forces or tensile forces which they can easily withstand.

According to another mode of execution of the invention, the fastening device brings into play a through hole made in the unit coaxially to the actuation axis, between two opposite and parallel plane faces. In this case, the fastening of the unit to the actuating ring makes use of a headed tie rod passing through the unit to get fixed on said ring, the head of the tie rod being supported on the unit by means of a prestressed elastic device so as to exert a force that is applied between the ring and the unit.

Through this arrangement, problems relating to bonding and therefore problems of differential expansion are avoided.

Furthermore, it becomes possible to use the tie rod as a thermal conductor to obtain a homogenization of the unit in temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a partial schematic axial section illustrating the principle of the mounting of an optical unit on a driving ring by means of a rod passing through a hole of the unit; and FIG. 9 is a schematic view similar to that of FIG. 8 in the case of the mounting of the unit between two wheels of an actuating mechanism.

DESCRIPTION OF THE PREFERRED EMBODIMENTS

Figure 1:
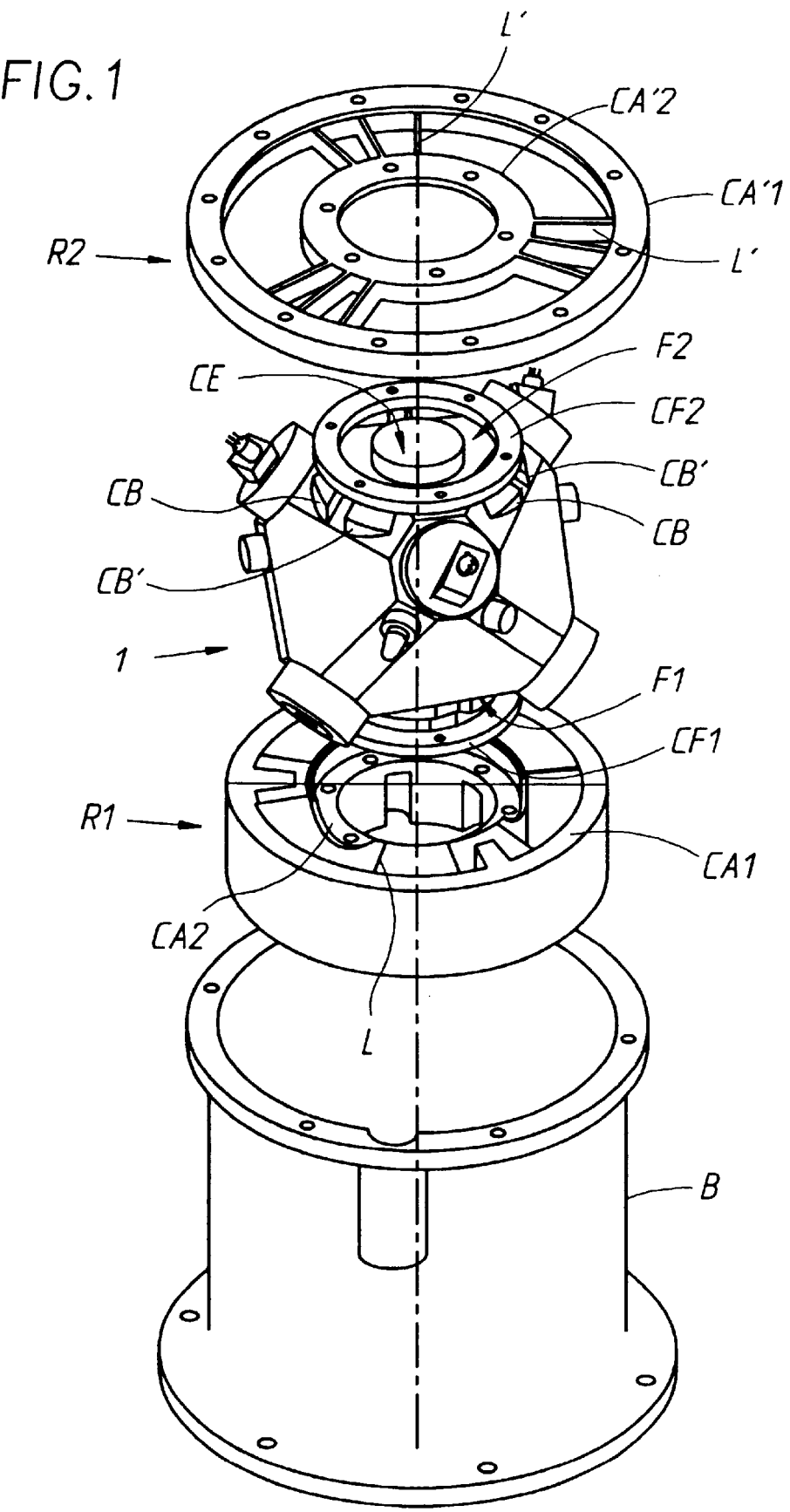
FIG. 1 is an exploded view in perspective illustrating the principle of the mounting, with two polar wheels, of an optical unit of a triaxial laser gyrometer on its actuating mechanism.

Referring now to the drawings, wherein like reference numerals designate identical or corresponding parts throughout the several views, and more particularly to FIG. 1 thereof, there is illustrated mounting of an optical unit 1 using an actuation wheel $R_1$ and a balancing wheel $R_2$ according to the present invention.

In this example, the actuating mechanism comprises first of all an actuating wheel $R_1$ comprising two coaxial rings $CA_1$, $CA_2$ connected to each other by a plurality of radial fins L. In a standard way, these fins L comprise a piezoelectrical driving and detection element connected to the amplifier so as to cause a motion of alternating rotation of one of the rings $CA_2$ with respect to the other ring $CA_1$.

The fastening of the optical unit 1 to the central ring $CA_2$ (actuating ring) of the actuating mechanism is done by means of a fastening ring $CF_1$, substantially with the same diameter as the actuating ring $CA_2$ on which it can be assembled coaxially by screwing.

This fastening ring $CF_1$ which is designed to be positioned coaxially with the cathode K has three pairs of beveled shims located at 120° with respect to one another and designed to get bonded respectively to the central regions of the chamfered ridges surrounding the face $F_1$ of the unit.

The balancing wheel $R_2$ comprises, for its part, two coaxial rings $CA'_1$, $CA'_2$ connected to each other by a plurality of flexible radial fins L'.

Similarly to the previous case, the fastening of the ring $CA'_2$ to the optical unit 1 (opposite its equatorial plane with respect to the actuating wheel $R_1$) is done by means of a fastening ring $CF_2$ substantially having the same diameter as the ring $CF_1$ and identical to the ring $CA'_2$ on which it can be assembled coaxially by means of screws.

This fastening ring $CF_2$ has three pairs of beveled shims CB, CB' located at 120° with respect to one another and designed respectively to get bonded to the central regions of the chamfered ridges surrounding the face $F_2$.

The assembly comprising the optical unit 1 and the two wheels $R_1$, $R_2$ is housed in a gyrometer casing B whose internal cylindrical shape is substantially equal to the external diameter of the rings. Fastening means are planned in order to hold the rings $CA_1$, $CA'_1$ on the casing B by providing for both the mechanical fastening of the two rings and a thermal link.

In accordance with the invention, the fastening rings $CF_1$, $CF_2$ are specially designed to enable the transmission, with a high degree of stiffness, of the torques generated by the actuating wheel or wheels $CA_2$, $CA'_2$, and to enable adaptation and compensation for the dimensional differences that arise between the unit 1 and the fastening rings $CF_1$, $CF_2$ due to expansion phenomena.

Figure 2:
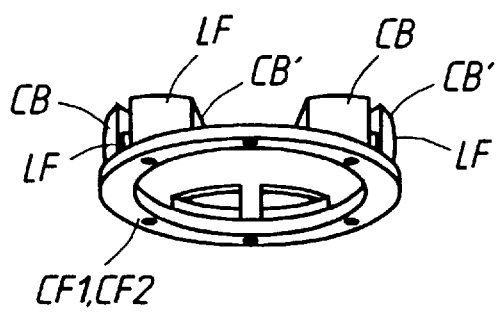
FIGS. 2, 3–4, 5–7 give respectively bottom and top views in perspective of fastening rings that can be used for the assembly of an optical unit of the type shown in FIG. 1 on an actuating mechanism.
Figure 3:
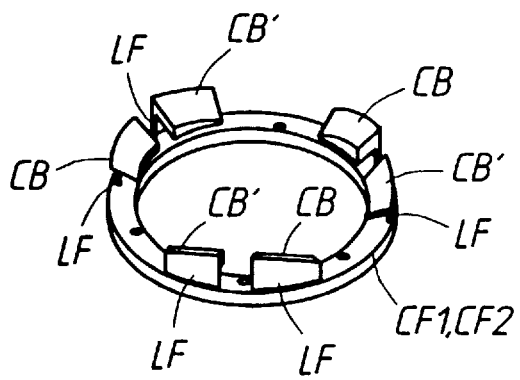

Thus, in the example shown in FIGS. 2 and 3, the securing shims CB, CB' are connected to the fastening ring by flexible tongues LP that are in the shape of a cylindrical sector extending coaxially with the ring $CF_1$, $CF_2$ from the external edge of this ring. In fact, each shim CB, CB' with its tongue LF forms one and only one element with a substantially L-shaped axial section with the horizontal arm of the L returning to the center of the ring $CF_1$, $CF_2$. Naturally, the fastening face of the shims CB, CB' has an appropriate orientation (an obliqueness) such that it can be applied without strain and get bonded to a corresponding facet of the optical unit 1.

In this case, apart from the fact that an efficient positive transmission is obtained for the pairs constituted by the units and the wheels $R_1$, $R_2$ in minimizing the shear stresses at the bonding zones (essentially tensile/compression strains), compensation is obtained with the self-centering of the unit 1 when phenomena of expansion occur especially at the actuation wheels $R_1$, $R_2$.

Figure 4:
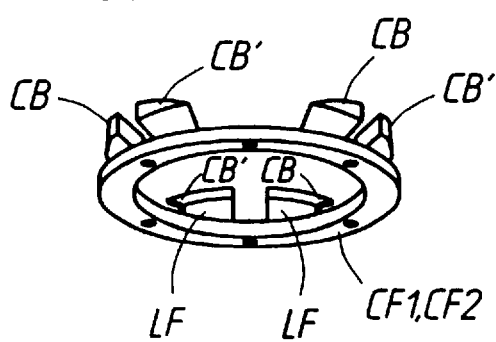
Figure 5:
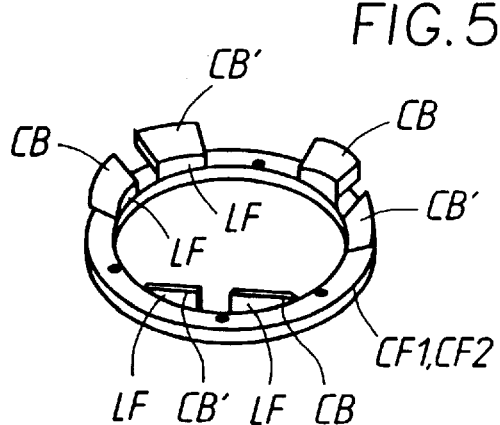

In the example shown in FIGS. 4 and 5, the securing shims CB, CB' (which have a shape and an arrangement similar to those described here above with reference to FIGS. 2 and 3) are connected to the fastening rings $CF_1$, $CF_2$ by flexible tongues LF shaped as coaxial circular sectors extending axially from the inner edge of the ring $CF_1$, $CF_2$. The assembly formed by the shims CB, CB' and the tongue LF has a substantially L-shaped section in which the horizontal arm stretches to the exterior of the ring $CF_1$, $CF_2$.

Naturally, the invention is not limited to the two modes of execution described here above.

Indeed, the fastening rings $CF_1$, $CF_2$ could be fixed to one and the same fastening face of the unit 1 perpendicularly to the actuation axis.

Figure 6:
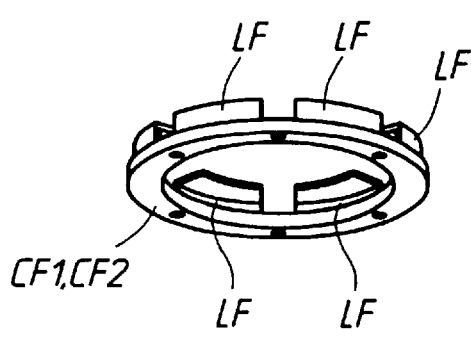
Figure 7:
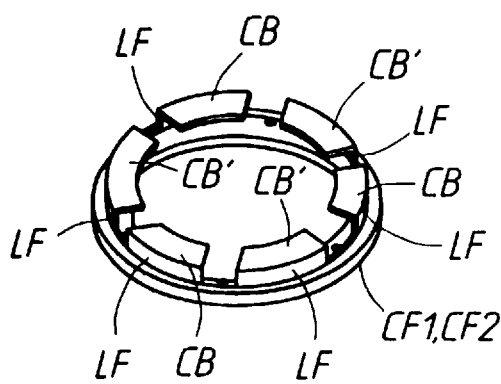

In this case, the securing shims CB, CB' could extend in parallel to the plane of the ring $CF_1$, $CF_2$ as shown in FIGS. 6 and 7. In this case, these shims CB, CB', with the flexible tongues LF, form L-shaped structures connected to the ring at its outer edge, the horizontal arms of the L returning to the center of the ring $CF_1$, $CF_2$. It is clear that, in this case, the bonding zones which will be subjected to shearing strains should have greater surface areas in order to be able to display resistance.

In the examples shown in FIGS. 8 and 9, the fastening of the optical unit 1 to the actuating mechanism is done by clamping by means of a pin AX passing through a through hole P made in the unit 1.

This mode of fastening can be applied to single-axis gyrometers that may have flattened shapes as well as triaxial gyrometers with compact multihedral shapes close to the shape of a sphere.

In these examples, only the hub M of the actuating wheel $R_1$ with the starting portion of the fins L has been shown: this hub M has an H-shaped axial section with a central passage made in the transversal arm of the H.

Similarly, the optical unit has been shown partially. It is limited by two opposite parallel faces $F_1$, $F_2$. The remainder of the unit 1 may have any shape.

In the example shown in FIG. 8, the pin has an end that gets engaged into the cylindrical cavity of the hub M while its other end is provided with a head T whose base forms a radial circular shoulder EC.

The length of the pin AX between the shoulder EC and the radial face FR of the hub M, on which the unit 1 is supported, is slightly greater than the length of the through hole P.

The fastening of the unit 1 to the face FR of the hub M is then provided by prestressed elastic means positioned between the shoulder EC of the head T and that face of the unit 1 which is located on the same side as said head.

In this example, the elastic means consist of a Belleville washer RB supported on a washer RD held by the face $F_1$ of the unit 1.

Advantageously, the centering of the pin AX in the hole P will be done by O-rings TR.

As need be, the pin AX could be thermally insulated from the unit 1 or, on the contrary, in thermal contact with this unit 1 for example by means of a gel that is a good conductor of heat.

In the example shown in FIG. 9, the pin AX consists of a tube made of a material with a low coefficient of expansion such as Invar for example.

This tube which passes through the hole of the unit gets engaged and fixed:

at one of its ends in the cavity of the hub of an actuating wheel $R_1$ of an actuating mechanism similarly to the previous case, and at its other end, to a cylindrical sleeve MC that is fixedly joined to the central hub M' of a balancing wheel $R_2$ forming part of the actuating mechanism.

The hub M' of the balancing wheel $R_2$ fulfills the same role as the head T of the pin AX described here above.

similarly, the fixing by clamping is obtained by means of a Belleville washer RB positioned between a shoulder EP of the hub M' and a support washer RD lying on the unit 1.

In both these examples, the clamping is controlled by defining the dimensions of the different parts (the hub of the wheels M, M', the head T, the pin AX, the support washer RD, the Belleville washer RB). The crushing (prestressing) of the Belleville washer RB provides for the fixing of the unit 1 by clamping despite the dimensional variations of the driving pin AX due to phenomena of expansion.

The Belleville washer RB is designed according to the following criteria:

minimum pressure to ensure the actuating drive, variation of the length of the different parts in temperature, variation of the crushing of the washer RB under the effect of acceleration or shocks perceived by the optical unit 1.

The modes of execution described in FIGS. 8 and 9 are simple solutions that can be set up very quickly and therefore cost little. They furthermore have the advantages of:

removing the need to use links by bonding, enabling efficient control over the forces applied to the optical unit 1, in amplitude (pressure determined by prestressing of the Belleville washer RB) as well as an orientation (trisector of the unit 1 in the case of a triaxial gyrometer or axis of the gyrometer in the case of a single-axis gyrometer), precise centering and positioning of the pin AX with respect to the gyrometer (through the O-rings), minimizing the strains exerted on the support faces $F_1$, $F_2$ of the unit 1 owing to the phenomena of expansion (the pin AX could be made of a material with a low coefficient of expansion), enabling a wider choice of materials used to make the gyrometer owing to the fact that the strains are concentrated on the metal pin AX (thus the actuating wheels $R_1$, $R_2$ could be made of steel), permitting thermal environments that are harsher owing to the absence of direct bonding between an actuating wheel $R_1$, $R_2$ made of metal and an optical unit 1 made of a material such as Zerodur Obviously, numerous modifications and variations of the present invention are possible in light of the above teachings. It is therefore to be understood that within the scope of the appended claims, the invention m ay be practiced otherwise than as specifically described herein.

What is claimed as new and desired to be secured by Letters Patent of the United States is:

1. A device for fastening an optical unit of a laser gyrometer to an actuating ring of an actuating mechanism, comprising:

means for transmission, to said optical unit, of rotational torque generated by said actuating mechanism; and means for compensating for differences in dimensions between said optical unit and said actuating ring.

2. The device according to claim 1, wherein said means for transmission comprises a fastening ring fixedly joined to said actuating ring; and said means for compensating comprises a plurality of securing shims uniformly distributed and connected to said fastening ring by a flexible axial tongue, wherein said plurality of securing shims are adapted to be fixed by bonding to at least one face of said optical unit.

3. The device according to claim 2, wherein said flexible axial tongue is shaped like a cylindrical sector.

4. The device according to claim 3, wherein each of said beveled shims, with said respective axial tongue, constitute a part with an L-shaped axial section.

5. The device according to claim 4, wherein each of said respective axial tongues are fixedly joined to an external edge of said fastening ring, and each of said beveled shims makes a return to a center of said actuating ring.

6. The device according to claim 2, wherein said flexible axial tongue is fixedly joined to an interior of said fastening ring, and said plurality of securing shims extend towards an exterior of said actuating ring.

7. The device according to claim 2, wherein said plurality of securing shims have an appropriate obliqueness such that said plurality of securing shims can be bonded without strain to a facet of said optical unit.

8. The device according to claim 2, wherein fastening faces of said plurality of securing shims extend in a plane perpendicular to an axis of actuation and are adapted to be bonded to one and the same face of said optical unit.

9. The device according to claim 1, wherein said optical unit has an octahedral shape and an axis of actuation passes through a center of two parallel and opposite triangular faces of said optical unit, said two faces being bordered by chamfered ridges, and said means for transmission comprises a fastening ring including three pairs of beveled shims with respective axial tongues and located at 120° with respect to one another, and adapted to be bonded to central regions of said chamfered ridges.

10. The device according to claim 1, further comprising:

a through hole provided in said optical unit coaxially to an actuation axis, between two opposite and parallel faces of said optical unit; and a headed tie rod passing through said through hole and adapted to be fixed to said actuating ring;

wherein said headed tie rod is supported on said optical unit by means of a prestressed elastic means so as to exert a force that is applied between said actuating ring and said optical unit.

11. The device according to claim 10, wherein said headed tie rod comprises a hub of a balancing wheel.

12. A laser gyrometer system, comprising:

an optical unit;

an actuating mechanism having an actuating ring;

means for transmission, to said optical unit, of rotational torque generated by said actuating mechanism; and means for compensating for differences in dimensions between said optical unit and said actuating ring.

13. The system of claim 12, wherein said means for transmission comprises a fastening ring fixedly joined to said actuating ring; and said means for compensating comprises a plurality of securing shims uniformly distributed and connected to said fastening ring by a flexible axial tongue, wherein said plurality of securing shims are adapted to be fixed by bonding to at least one face of said optical unit.

14. The system of claim 13, wherein said flexible axial tongue is shaped like a cylindrical sector.

15. The system of claim 14, wherein each of said beveled shims, with said respective axial tongue, constitute a part with an L-shaped axial section.

16. The system of claim 15, wherein each of said respective axial tongues are fixedly joined to an external edge of said fastening ring, and each of said beveled shims makes a return to a center of said actuating ring.

17. The system of claim 13, wherein said flexible axial tongue is fixedly joined to an interior of said fastening ring, and said plurality of securing shims extend towards an exterior of said actuating ring.

18. The system of claim 13, wherein said plurality of securing shims have an appropriate obliqueness such that said plurality of securing shims can be bonded without strain to a facet of said optical unit.

19. The system of claim 13, wherein fastening faces of said plurality of securing shims extend in a plane perpendicular to an axis of actuation and are adapted to be bonded to one and the same face of said optical unit.

20. The system of claim 12, wherein said optical unit has an octahedral shape and an axis of actuation passes through a center of two parallel and opposite triangular faces of said optical unit, said two faces being bordered by chamfered ridges, and said means for transmission comprises a fastening ring including three pairs of bevelled shims with respective axial tongues and located at 120° with respect to one another, and adapted to be bonded to central regions of said chamfered ridges.

21. The system of claim 12, further comprising:

a through hole provided in said optical unit coaxially to an actuation axis, between two opposite and parallel faces of said optical unit; and a headed tie rod passing through said through hole and adapted to be fixed to said actuating ring;

wherein said headed tie rod is supported on said optical unit by means of a prestressed elastic means so as to exert a force that is applied between said actuating ring and said optical unit.

22. The system of claim 21, wherein said headed tie rod comprises a hub of a balancing wheel.

* * * * *